United States Patent
Katahira et al.

(10) Patent No.: US 8,120,645 B2
(45) Date of Patent: Feb. 21, 2012

(54) STEREO CAMERA UNIT

(75) Inventors: Satoshi Katahira, Tokyo (JP); Nobuo Namiki, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 498 days.

(21) Appl. No.: 12/425,483

(22) Filed: Apr. 17, 2009

(65) Prior Publication Data

US 2009/0268013 A1 Oct. 29, 2009

(30) Foreign Application Priority Data

Apr. 25, 2008 (JP) ................................. 2008-115854
Feb. 2, 2009 (JP) ................................. 2009-021789

(51) Int. Cl.
*H04N 13/02* (2006.01)

(52) U.S. Cl. .......... 348/46; 348/118; 348/188; 348/373; 348/95; 348/113; 348/180; 348/375; 348/376; 396/118; 396/424; 340/436; 340/901

(58) Field of Classification Search .................... 348/46, 348/118, 188, 373, 95, 113, 180, 376, 220
See application file for complete search history.

(56) References Cited

U.S. PATENT DOCUMENTS

| 6,785,403 B1 * | 8/2004 | Murakami et al. ............. 382/104 |
| 6,811,330 B1 | 11/2004 | Tozawa et al. |
| 7,391,467 B2 * | 6/2008 | Kim .............................. 348/375 |

FOREIGN PATENT DOCUMENTS

JP 2001-088623 A 4/2001

* cited by examiner

*Primary Examiner* — Jude Jean Gilles
(74) *Attorney, Agent, or Firm* — McDermott Will & Emery LLP

(57) ABSTRACT

An adjuster plate is provided between a front rail and a camera unit body having cameras. Pre-dimensioned positioning pins protrude from upper and lower surfaces of the adjuster plate. The positioning pins protruding from the upper surface of the adjuster plate are positioned by being fitted in pin fitting holes provided in the front rail. The positioning pins protruding from the lower surface of the adjuster plate are positioned by being fitted in pin fitting holes provided in the camera unit body. Even when the positions of the pin fitting holes in the front rail are changed, it is possible to cope with the change by only changing the protruding positions of the positioning pins.

4 Claims, 7 Drawing Sheets

STEREO CAMERA UNIT

CROSS-REFERENCE TO RELATED APPLICATIONS

The disclosures of Japanese Patent Application No. 2008-115854 filed on Apr. 25, 2008 and Japanese Patent Application No. 2009-021789 filed on Feb. 2, 2009 including the specification, drawings and abstract are incorporated herein by reference in their entirety.

BACKGROUND OF THE INVENTION

1. Field of the Invention

The present invention relates to a stereo camera unit in which a camera unit body having a pair of video cameras is mounted at a predetermined position on a mount section.

2. Description of the Related Art

As a three-dimensional measuring technique using images, so-called stereoscopic image processing is known. In stereoscopic image processing, a pair of images of a target are taken by right and left video cameras (stereo cameras) from different positions, and correlation between the taken images is found. The distance between the stereo cameras and the target is found from the parallax with respect to the same object according to the principle of triangulation using preset parameters, for example, the distance (camera base length) between light-receiving surfaces of image sensors, such as CCDs (charge coupled devices), provided in the video cameras and the focal length.

In this stereoscopic image processing, two image signals obtained from the stereo cameras are superimposed while being sequentially shifted, and the position where the two image signals coincide is found.

The accuracy of the distance measured by stereoscopy depends on the accuracy of the mounting positions of the video cameras, more specifically, the positional accuracy between the light-receiving surfaces. When the light-receiving surfaces of the right and left video cameras are displaced, the camera base length changes, and this causes error between the measured distance and the actual distance. Similarly, tilting of the light-receiving surface of each video camera also reduces the measurement accuracy.

For this reason, the camera base length is defined by fixing the right and left video cameras at positions in the camera unit body that ensure the preset camera base length.

However, even when the camera base length between the video cameras is accurately defined, if the mount position of the camera unit body is displaced by crossing of a bolt and a screw hole when the camera unit body is fixed only by the screw, translational displacement in the up-down direction and rotational direction occurs to the video cameras.

As measures against the above problem, the present applicant discloses a technique of ensuring the positional accuracy between both video cameras (Japanese Unexamined Patent Application Publication No. 2001-88623). In this technique, pins protrude at two positions in the center of a chassis (camera unit body), fitting holes in which the pins are fitted are provided in a front rail (mount section) of the vehicle, and the positional accuracy between the video cameras is ensured by fitting the pins in the fitting holes.

In this publication, a spacer is provided between the chassis and the front rail, and the pins are fitted in the fitting holes through the spacer. Therefore, by adjusting the thickness and so on of the spacer, the camera unit body can be accurately mounted without any influence of inclination of the chassis that differs among the types of vehicles.

In the technique disclosed in the above publication, when the camera unit body is mounted to the mount section, it is positioned by fitting the pins protruding from the camera unit body into the fitting holes provided in the mount section. Therefore, when the positions of the fitting holes in the front rail are changed, the positions of the pins protruding from the chassis also need to be changed.

However, if the positions of the pins protruding from the camera unit body are changed in accordance with the positions of the fitting holes in the mount section, it is necessary to prepare a camera unit body for each type of mount section. This makes parts sharing difficult, and lacks versatility.

Further, when a camera unit body is prepared for each type of the mount section, parts management becomes troublesome, and management cost increases.

SUMMARY OF THE INVENTION

Accordingly, the present invention has been made in view of the above-described circumstances, and it is an object of the invention to provide a stereo camera unit which can respond to the change of a fitting hole provided in a mounted portion, without changing the mounted position of a camera unit body, when fixing the camera unit body to the mounted portion, which enables parts sharing, and which can reduce product cost.

In order to achieve the above object, a stereo camera unit according to an embodiment of the present invention includes an adjuster plate; and a camera unit body to be fixed to a mounted portion through the adjuster plate, the camera unit body including a pair of video cameras spaced a predetermined distance apart from each other. A pre-dimensioned positioning pin protrudes from either one of the mounted portion and a face of the adjuster plate to contact with the mounted portion, and a pre-dimensioned pin fitting hole is provided in the other so as to be fitted on the positioning pin. A pre-dimensioned positioning pin protrudes from either one of the camera unit body and a face of the adjuster plate to contact with the camera unit body, and a pre-dimensioned pin fitting hole is provided in the other so as to be fitted on the positioning pin.

According to the present invention, a pre-dimensioned positioning pin protrudes from either one of the mounted portion and the face of the adjuster plate to contact with the mounted portion, and a pre-dimensioned pin fitting hole is provided in the other to be fitted on the positioning pin. A pre-dimensioned positioning pin protrudes from either one of the camera unit body and the face of the adjuster plate to contact with the camera unit body, and a pre-dimensioned pin fitting hole is provided in the other so as to be fitted on the positioning pin. Hence, even when the position of the positioning pin or the pin fitting hole provided in the mounted portion is changed, it is possible to cope with the change by only changing the position of the corresponding positioning pin or pin fitting hole. As a result, it is unnecessary to change the mounting position of the camera unit body, the camera unit body can be commonly used, and versatility can be enhanced. Further, since the camera unit body can be commonly used, parts management is facilitated, and product cost can be reduced.

BRIEF DESCRIPTION OF THE DRAWINGS

FIG. 4A is a plan view of the adjuster plate, FIG. 4B is a cross-sectional view, taken along line IVB-IVB in FIG. 4A, and FIG. 4C is a bottom view of the adjuster plate;

FIG. 6A is a plan view of the adjuster plate, FIG. 6B is a cross-sectional view, taken along line VIB-VIB in FIG. 6A, and FIG. 6C is a bottom view of the adjuster plate;

FIG. 8A is a plan view of the adjuster plate, FIG. 8B is a cross-sectional view, taken along line VIIIB-VIIIB in FIG. 8A, and FIG. 8C is a bottom view of the adjuster plate.

DESCRIPTION OF THE PREFERRED EMBODIMENTS

Embodiments of the present invention will be described below with reference to the drawings.

First Embodiment

Figure 1:
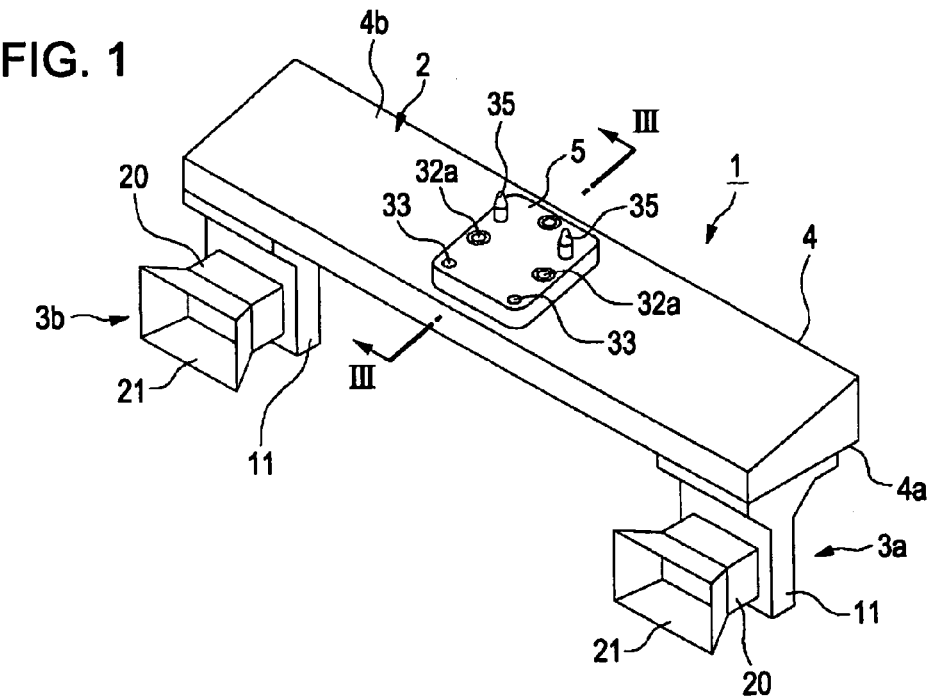
FIG. 1 is a perspective view of a stereo camera unit according to a first embodiment.
Figure 2:
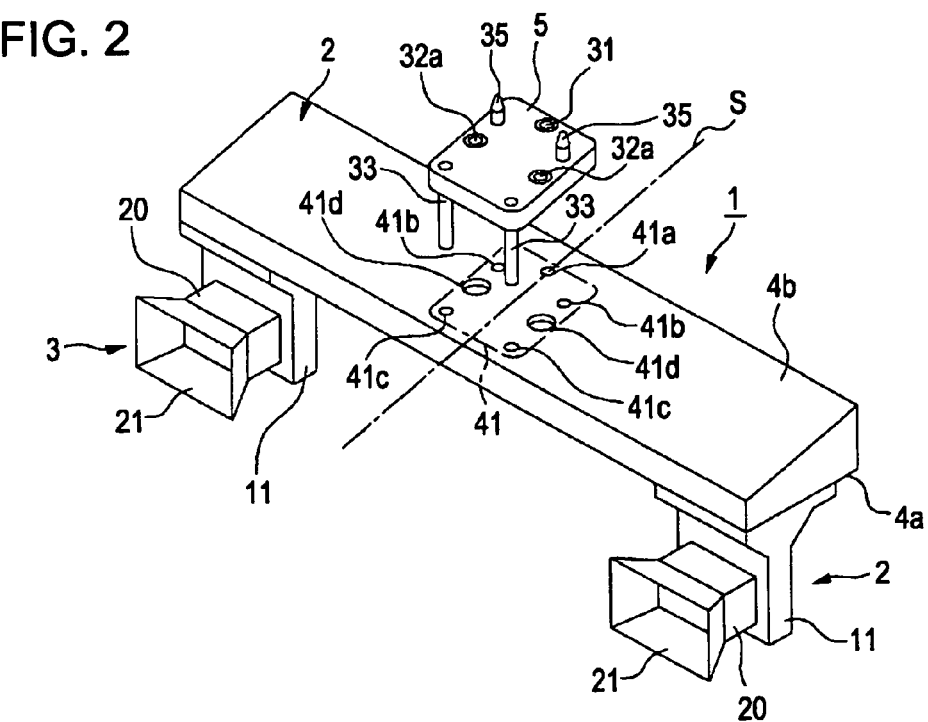
FIG. 2 is a perspective view showing a state in which a camera unit body and an adjuster plate are separated in the first embodiment.
Figure 3:
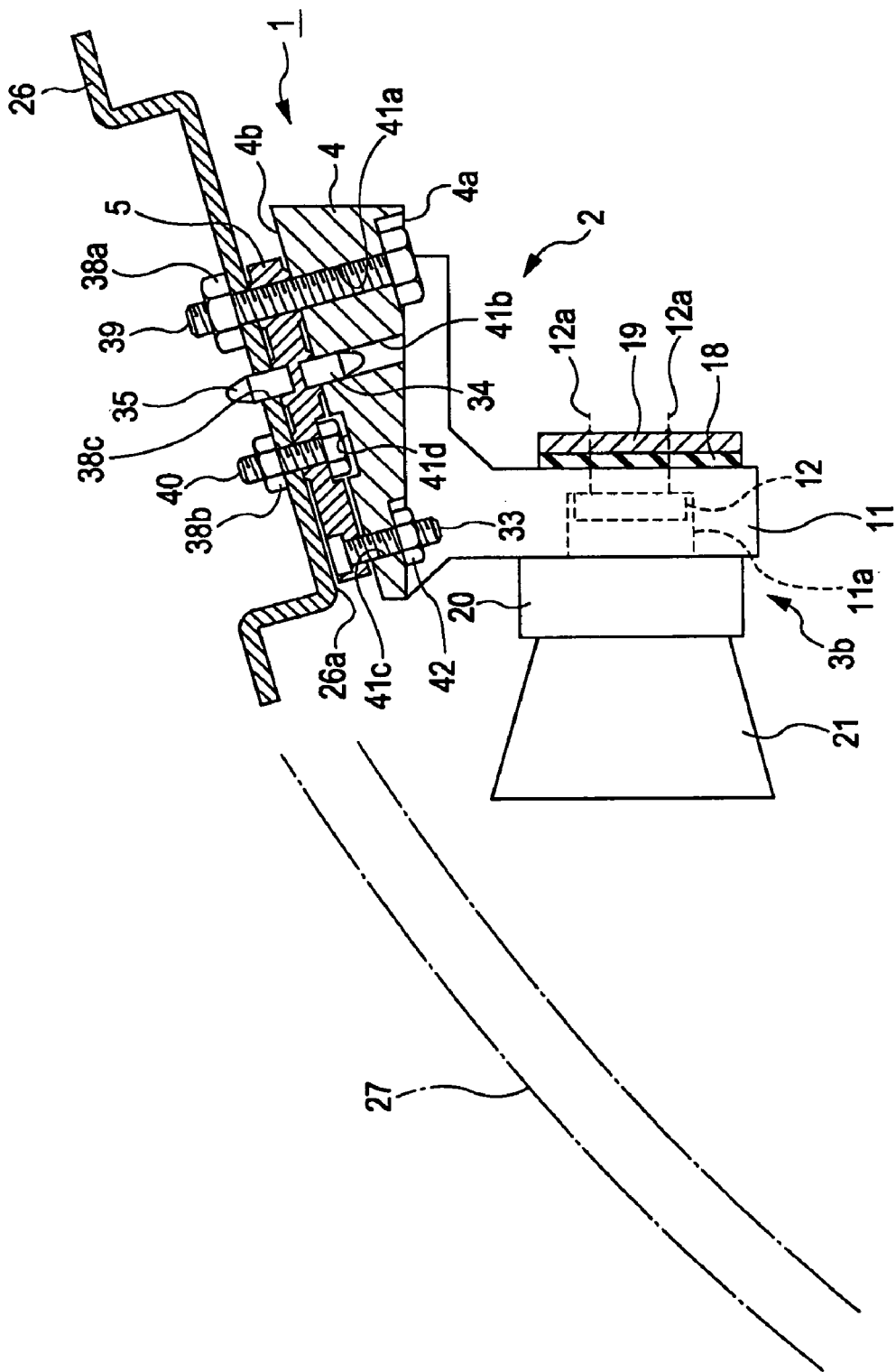
FIG. 3 is a cross-sectional view, taken along line III-III in FIG. 1.

FIGS. 1 to 4 show a first embodiment of the present invention. FIG. 1 is a perspective view of a stereo camera unit, FIG. 2 is a perspective view showing a state in which a camera unit body and an adjuster plate are separated, FIG. 3 is a cross-sectional view, taken along line III-III in FIG. 1, and FIGS. 4A, 4B, and 4C show the adjuster plate. FIG. 4A is a plan view of the adjuster plate, FIG. 4B is a cross-sectional view, taken along line IVB-IVB in FIG. 4A, and FIG. 4C is a bottom view of the adjuster plate.

A stereo camera unit 1 of the first embodiment is fixed at the widthwise center of a camera stay 4, which will be described below, to the center in the vehicle width direction of a bottom surface of a front rail 26 serving as a mount section (see FIG. 3). The front rail 26 is provided at the upper front of the interior of the vehicle, and extends in the vehicle width direction. In FIG. 3, reference numeral 27 denotes a front glass of the vehicle. In the following description, the directions (front, rear, right, left, upward, and downward directions) of the stereo camera unit 1 (front, rear, right, left, upward, and downward direction) correspond to the directions (front, rear, right, left, upward, and downward directions) of the vehicle in which the stereo camera unit 1 is installed.

The stereo camera unit 1 includes a camera unit body 2 and an adjuster plate 5. The camera unit body 2 includes a main video camera 3a and a sub video camera 3b that are spaced a fixed distance apart in the right-left direction, and a camera stay 4. The video cameras 3a and 3b are provided on the right and left sides at equal distances from the widthwise center line S of the camera stay 4. The camera stay 4 is formed with the widthwise center line S as a reference position. An upper surface 4b of the camera stay 4 is fixed at the widthwise center line S to the front rail 26 via the adjuster plate 5. Since the video cameras 3a and 3b have the same structure, only a structure of the main video camera 3a will be described below. Like components of the sub video camera 3b are denoted by the same reference numerals as those in the main video camera 3a, and descriptions thereof are omitted.

Referring to FIG. 3, a camera body 11 of the main video camera 3a (sub video camera 3b) is provided on a lower surface 4a of the camera stay 4. The right and left camera bodies 11 and the camera stay 4 adopted in the first embodiment are formed of aluminum or an aluminum alloy. After being separately produced by machining, the camera bodies 11 and the camera stay 4 are combined at a predetermined position. Alternatively, the camera bodies 11 and the camera stay 4 may be integrally molded by die casting or by other methods.

As shown in FIG. 3, the cross section of the camera stay 4 is substantially shaped like a wedge that is inclined upward from the front side toward the rear side. As will be described below, the inclination angle of the camera stay 4 is set, corresponding to the standard inclination angle of a contact face of the front rail 26, so that the optical axes of the video cameras 3a and 3b point in a preset direction.

The camera body 11 includes a sensor storage portion 11a for storing an image sensor 12. The image sensor 12 is shaped like a rectangular parallelepiped, and the outside dimensions thereof are set within a preset tolerance. While a CCD (charge coupled device) image sensor, a CMOS (complementary metal oxide semiconductor) sensor, etc. can be used as the image sensor 12, the image sensor 12 adopted in this embodiment is not limited thereto.

The sensor storage portion 11a is concave such as to open at the front and to have a bottom. The image sensor 12 is properly positioned and stored in the sensor storage portion 11a. Leads 12a extending from the rear face of the image sensor 12 extend through relief holes (not shown) formed in the bottom face of the sensor storage portion 11a, and protrude from the rear face of the camera body 11. The leads 12a protruding from the rear face of the camera body 11 further extend through an insulating elastic sheet 18 formed of foamed rubber, silicon rubber, or the like, and are soldered to a circuit board 19. The image sensor 12 and the circuit board 19 are biased by resilient force of the elastic sheet 18 in directions such as to get away from each other. The rear face of the image sensor 12 is made in contact with a bottom face of the sensor storage portion 11a by resilient force of the elastic sheet 18.

Two side walls and the bottom face of the sensor storage portion 11a that are orthogonal to one another are dimensioned and planed by post machining such as grinding. To the side walls and the bottom face, two sides and a rear face of the image sensor 12 corresponding thereto are fixed in contact therewith. Therefore, the image sensor 12 is positioned in the front, rear, right, left, upward, and downward directions with the side walls and bottom face of the sensor storage portion 11a used as datum planes. Further, a lens barrel 20 in which an image pickup lens and so on are stored is attached to a front face of the camera body 11, and a lens hood 21 is fixed to the leading end of the lens barrel 20.

As shown in FIG. 2, a plate-lower-surface contact face 41 with which the adjuster plate 5 contacts is provided in the widthwise center of the upper surface of the camera stay 4, that is, the center between the optical axes of the video cameras 3a and 3b. A bolt insertion hole 41a is provided in the widthwise center of the rear of the plate-lower-surface contact face 41. A pair of right and left pin fitting holes 41b are provided in front of the bolt insertion hole 41a.

Further, a pair of right and left bolt insertion holes 41c are provided in the front of the plate-lower-surface contact face 41. Bolt-head relief recesses 41d are provided between the bolt insertion holes 41c and the pin fitting holes 41b provided therebehind. Positioning pins 35 protruding from the adjuster plate 5, which will be described below, are fitted in the pin fitting holes 41b. The pin fitting holes 41b are properly dimensioned on the basis of the widthwise center of the camera stay 4 and with predetermined fitting dimensions with respect to the positioning pins 35. The entirety of the plate-lower-surface contact face 41 is properly planed by post machining such as grinding.

Referring to FIG. 3, a plate-upper-surface contact face 26a is provided in the widthwise center of the bottom surface of the front rail 26 of the vehicle. The plate-upper-surface contact face 26a faces the above-described plate-lower-surface contact face 41 with the adjuster plate disposed therebetween. The plate-upper-surface contact face 26a has a bolt through hole at the same position as that of the bolt insertion hole 41a provided in the plate-lower-surface contact face 41. A weld nut 38a is welded on the upper side of the bolt through hole. Also, bolt insertion holes are provided at the same positions as those of the bolt-head relief recesses 41d, and weld nuts 38b are welded on the upper sides of the bolt insertion holes. Further, rail-side pin fitting holes 38c are provided at the same positions as those of the pin fitting holes 41b.

Figure 4A:
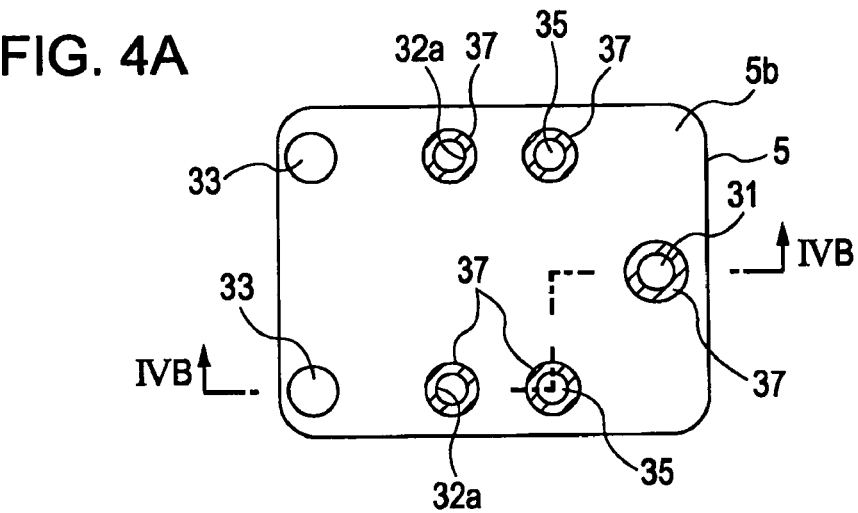
FIGS. 4A, 4B, and 4C show the adjuster plate in the first embodiment.
Figure 4B:
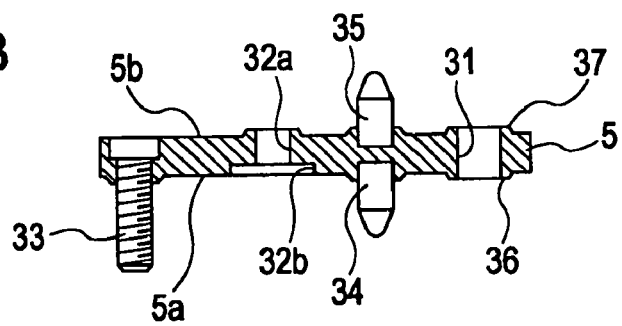
Figure 4C:
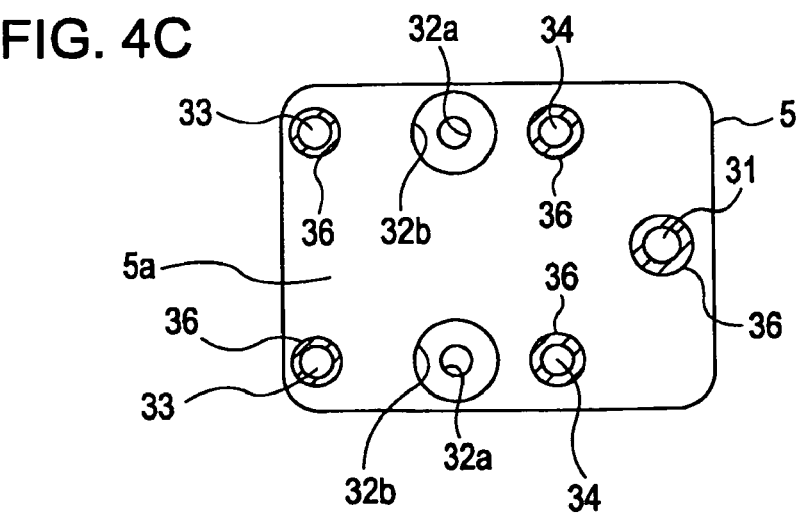

Referring to FIG. 4, the adjuster plate 5 has a bolt through hole 31 at the right center in the width direction (up-down direction in FIG. 4A). A pair of vertical positioning pins 34 (35), bolt insertion holes 32a, and weld bolts 33 are arranged symmetrically with respect to the widthwise center of the adjuster plate 5.

As shown in FIG. 3, the bolt through hole 31 is provided on the axis linking the bolt insertion hole 41a of the plate-lower-surface contact face 41 and the weld nut 38a welded to the plate-upper-surface contact face 26a. The lower-side positioning pins 34 serving as other positioning pins protrude from a lower surface 5a of the adjuster plate 5 so as to be fitted in the pin fitting holes 41b provided in the camera stay 4. The upper-side positioning pins 35 protrude from the upper surface 5b of the adjuster plate 5 at positions such as to be fitted in the rail-side fitting holes 38c provided in the front rail 26.

Bolt-head relief recesses 32b are provided at the bolt insertion holes 32a that open in the lower surface 5a of the adjuster plate 5. The bolt insertion holes 32a are provided on the axes linking the bolt-head relief recesses 41d provided in the upper surface of the camera stay 4 and the weld nuts 38b welded to the front rail 26. Further, thread portions of the weld bolts 33 protrude downward from the lower surface 5a of the adjuster plate 5, and the center axes of the weld bolts 33 are coaxial with the bolt insertion holes 41c provided in the camera stay 4. Still further, heads of the weld bolts 33 are machined such as to be flush with the upper surface 5b of the adjuster plate 5.

Positioning faces 36 and 37 are respectively provided on the lower surface 5a and the upper surface 5b of the adjuster plate 5 and around the bolt through hole 31 and the positioning pins 34 and 35, around the thread portions of the weld bolts 33 protruding from the lower surface 5a, and around the bolt insertion holes 32a that open in the upper surface 5b. The positioning faces 36 and 37 are properly dimensioned, and are formed by post machining, such as grinding, such as to be slightly higher than the surroundings. Therefore, the positioning faces 36 and 37 of the adjuster plate 5 are in contact with the contact face 41 of the camera stay 4 and the contact face 26a of the front rail 26.

The positioning pins 34 protruding from the lower surface 5a of the adjuster plate 5 and the pin fitting holes 41b provided in the camera stay 4 so as to be fitted on the positioning pins 34 are properly dimensioned, and are formed with present fitting dimensions. Further, the positioning pins 35 protruding from the upper surface 5b and the rail-side pin fitting holes 38c provided in the front rail 26 so as to be fitted on the positioning pins 35 are properly dimensioned, and are formed with preset fitting dimensions.

As shown in FIGS. 3 and 4, a penetrating bolt 39, which extends through the bolt insertion hole 41a of the camera stay 4 and the bolt through hole 31 of the adjuster plate 5, is screwed to the weld nut 38a welded to the front rail 26, so that the camera stay 4 and the adjuster plate 5 are fastened together to the front rail 26. Further, bolts 40 extending through the bolt insertion holes 32a of the adjuster plate 5 are screwed to the weld nuts 38b welded to the front rail 26, so that the adjuster plate 5 is fastened to the front rail 26. The weld bolts 33 protruding from the adjuster plate 5 toward the lower surface 5a are passed through the bolt insertion holes 41c of the camera stay 4 and are fastened by nuts 42. In this state, the positioning faces 36 and 37 provided on the lower surface 5a and the upper surface 5b of the adjuster plate 5 are respectively in contact with the contact face 41 of the camera stay 4 and the contact face 26a of the front rail 26, and are thereby positioned in the up-down direction.

A description will now be given of a procedure for assembling the stereo camera unit having the above-described configuration. First, a pair of positioning pins 35 protruding from the upper surface 5b of the adjuster plate 5 are fitted in a pair of rail-side fitting holes 38c provided in the plate-upper-surface contact face 26a of the front rail 26 of the vehicle.

The positioning pins 35 protruding from the upper surface 5b of the adjuster plate 5 and the pin fitting holes 38c provided in the front rail 26 are properly positioned, and are formed with preset fitting dimensions. Therefore, the adjuster plate 5 can be precisely positioned with respect to the front rail 26 in the right-left direction and depth direction by simply fitting the positioning pins 35 into the rail-side pin fitting holes 38c.

Next, the bolts 40 are inserted into the bolt insertion holes 32a of the adjuster plate 5 from the side of the lower surface 5a, and are screwed into the weld nuts 38b welded to the front rail 26, thus fixing the adjuster plate 5 to the front rail 26. Then, the positioning faces 37 provided on the upper surface 5b of the adjuster plate 5 are brought into contact with the contact face 26a of the front rail 26, and the adjuster plate 5 is precisely positioned and fixed to the front rail 26 in the up-down direction. Since the bolt insertion holes 32a are used only to pass the bolts 40 therethrough, the diameter thereof is set to be relatively larger than the bolt diameter.

As a result, the adjuster plate 5 is precisely positioned with respect to the front rail 26 in the right-left direction, depth direction, and up-down direction by simply being fastened to the front rail 26. Therefore, it is unnecessary to adjust the position after fastening.

Next, the integrally formed camera stay 4 in the camera unit 2 is attached to the lower surface 5a of the adjuster plate 5. For attachment, first, a pair of weld bolts 33 protruding from the lower surface 5a of the adjuster plate 5 are inserted in a pair of bolt insertion holes 41c provided in the camera stay 4. Since the bolt insertion holes 41 are used only to pass the weld bolts 33 therethrough, the diameter thereof is larger than the bolt diameter.

While the weld bolts 33 are being inserted in the bolt insertion holes 41c, a pair of positioning pins 34 protruding from the lower surface 5a of the adjuster plate 5 are fitted in a pair of pin fitting holes 41b provided in the camera stay 4.

The positioning pins 34 protruding from the lower surface 5a of the adjuster plate 5 and the pin fitting holes 41b provided in the camera stay 4 are properly positioned, and are formed with preset fitting dimensions. Therefore, the camera unit body 2 is precisely positioned with respect to the adjuster plate 5 in the right-left direction and depth direction by simply fitting the positioning pins 34 in the pin fitting holes 41b.

Subsequently, the nuts 42 are screwed on the weld bolts 33 extending through the bolt insertion holes 41c and protruding from the lower surface 4a of the camera stay 4, thus fixing the camera stay 4 to the adjuster plate 5. Then, the positioning face 36 on the lower surface 5a of the adjuster plate 5 is brought into contact with the contact face 41 of the camera stay 4, so that the camera stay 4 is precisely positioned and fixed to the adjuster plate 5 in the up-down direction.

Therefore, by simply fastening the camera stay 4 to the adjuster plate 5, the camera unit body 2 is precisely positioned with respect to the adjuster plate 5 in the right-left direction, depth direction, and up-down direction. In this case, since the adjuster plate 5 has already been precisely positioned and fixed to the front rail 26, the camera unit body 2 is also precisely positioned with respect to the front rail 26. Hence, it is unnecessary to perform position adjustment, such as adjustment of the optical axes of the video cameras 3a and 3b, after fastening.

After that, the penetrating bolt 39 is inserted in the bolt insertion hole 4a of the lower surface 4a of the camera stay 4 and the bolt through hole 31 of the adjuster plate 5, and is screwed to the weld nut 38a welded to the front rail 26 so as to fasten the camera stay 4, and the adjuster plate 5, and the front rail 26 together. Thus, attachment of the camera unit body 2 to the front rail 26 is completed.

As described above, In this embodiment, the positioning pins 34 and 35 protrude from the upper and lower surfaces 5a and 5b of the adjuster plate 5, and the camera unit body 2 is positioned with respect to the front rail 26 in the horizontal direction and depth direction via the positioning pins 34 and 35. Further, the positioning faces 36 and 37 are formed on the upper and lower surfaces 5a and 5b of the adjuster plate 5 for the purpose of positioning in the up-down direction. Therefore, the camera unit body 2 can be precisely positioned with respect to the front rail 26 in the three-dimensional direction by simply fixing the camera unit body 2 to the front rail 26 via the adjuster plate 5. As a result, adjustment after assembly is unnecessary, and this can greatly enhance operation efficiency.

Since the adjuster plate 5 is fixed separately to the front rail 26 and the camera stay 4, even when the positions of the rail-side pin fitting holes 38c are changed, for example, because of application to a different type of vehicle, it is possible to cope with the change by only changing the shape of the adjuster plate 5 and the protruding position of the positioning pins 35. Therefore, it is unnecessary to change the positions of the pin fitting holes 41b of the camera stay 4, and the camera unit body 2 can be used commonly. As a result, versatility is enhanced, and parts management is facilitated. In addition, since the camera unit body 2 can be shared among different types of vehicles, product cost can be reduced.

Second Embodiment

Figure 5:
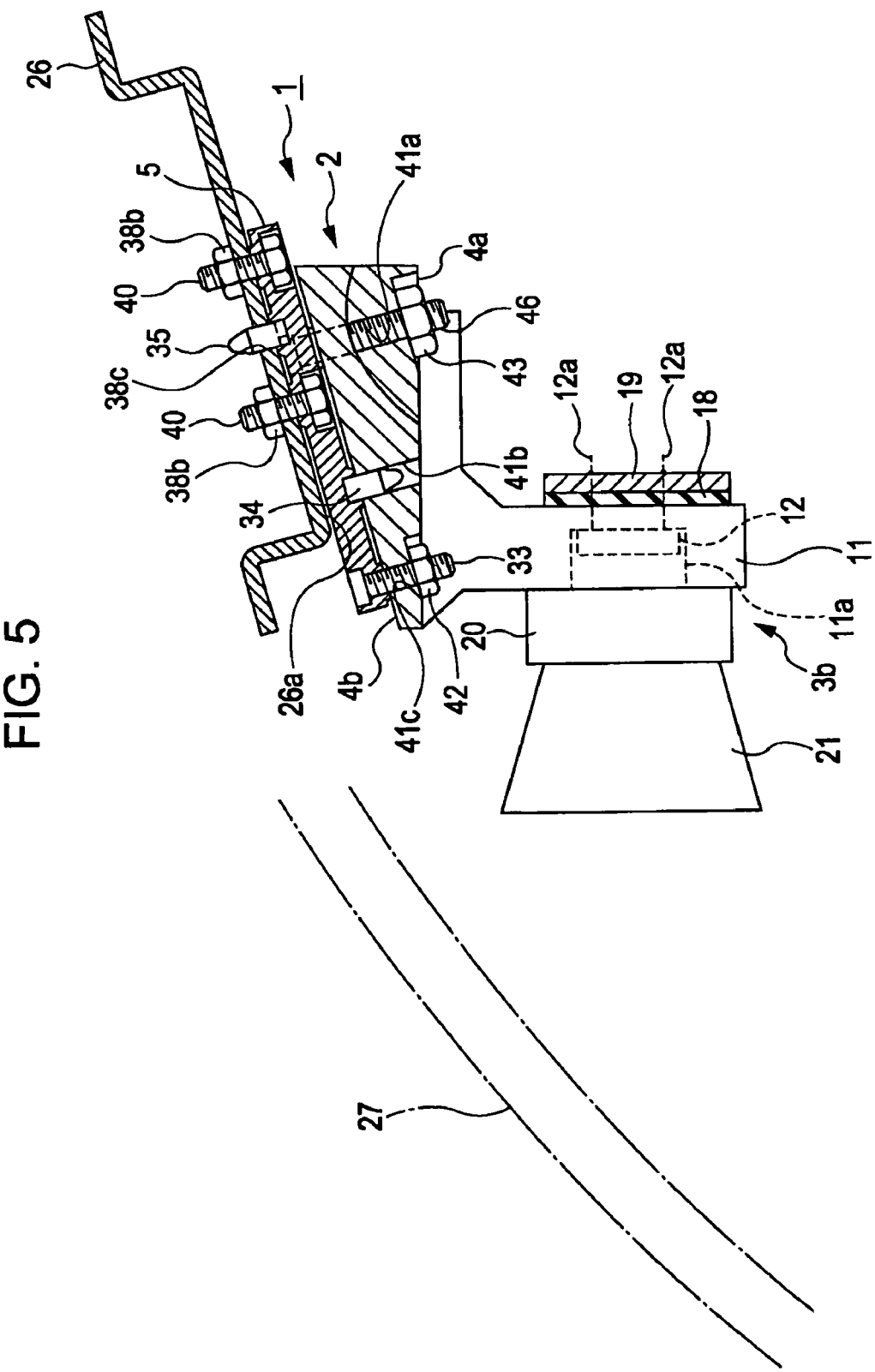
FIG. 5 is a perspective view of a stereo camera unit according to a second embodiment.
Figure 6A:
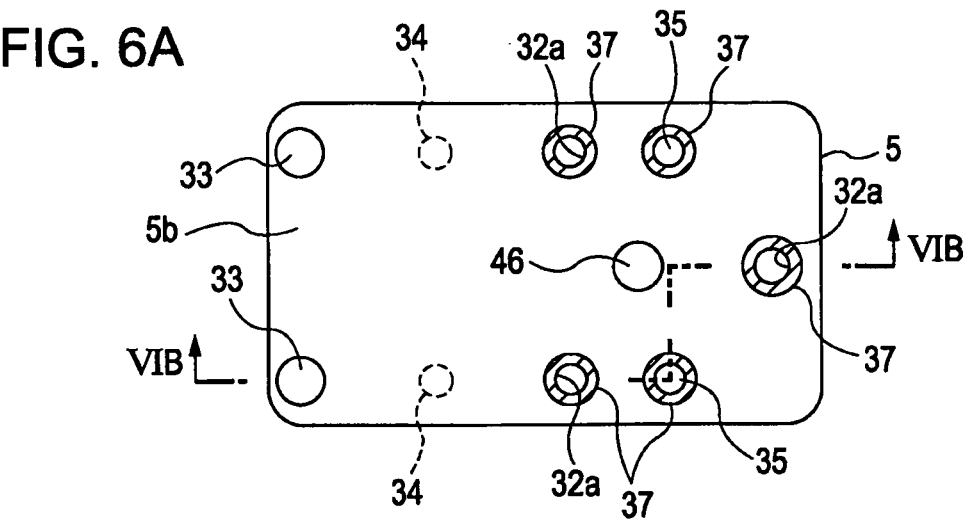
FIGS. 6A, 6B, and 6C show an adjuster plate in the second embodiment.
Figure 6B:
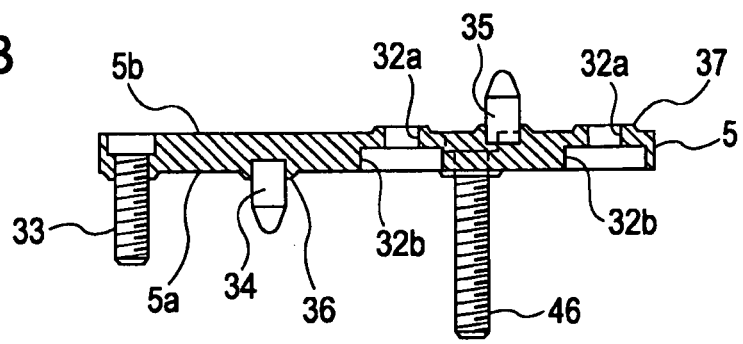
Figure 6C:
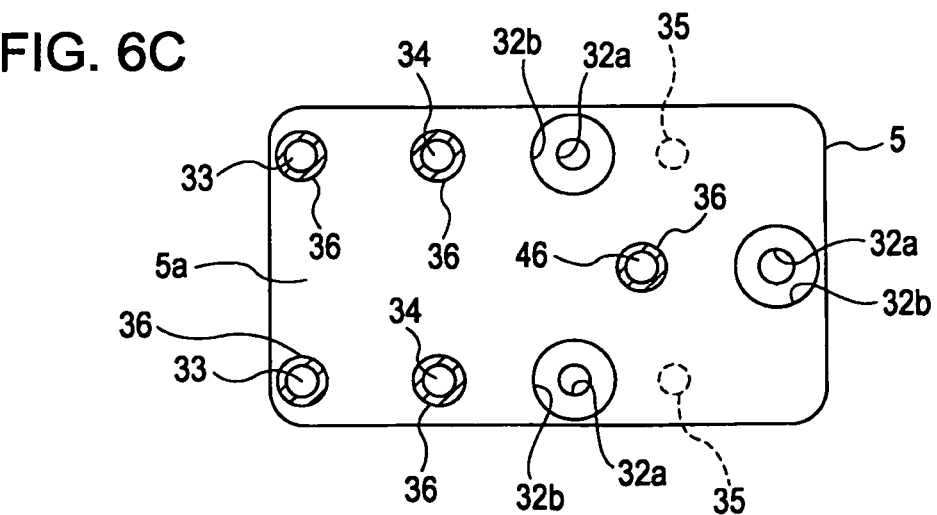

FIGS. 5 and 6 show a second embodiment of the present invention. FIG. 5 is a cross-sectional view of a stereo camera, corresponding to FIG. 3, and FIGS. 6A, 6B, and 6C show an adjuster plate. FIG. 6A is a plan view of the adjuster plate, FIG. 6B is a cross-sectional view taken along line VIB-VIB in FIG. 6A, and FIG. 6C is a bottom view of the adjuster plate.

While the camera unit body 2, the adjuster plate 5, and the front rail 26 are clamped by the penetrating bolt 39 in the above-described first embodiment, a front rail 26 and a camera unit body 2 are separately fixed via an adjuster plate 5 in the second embodiment. The same components as those in the first embodiment are denoted by the same reference numerals, and descriptions thereof are omitted. Video cameras 3a and 3b fixed to a lower surface 4a of a camera stay 4 are common to the first embodiment.

For example, when a front glass 27 is provided apart forward from the front rail 26, as shown in FIG. 5, it is preferable to shift the camera unit body 2 in front of the front rail 26 in order to ensure the field of view of the video cameras 3a and 3b.

FIGS. 6A to 6C show an adjuster plate 5 used when the camera unit body 2 is shifted forward. Positioning pins 34 protruding from a lower surface 5a of the adjuster plate 5 and positioning pins 35 protruding from an upper surface 5b are set at predetermined positions corresponding to pin fitting holes 41b provided in the camera stay 4 and rail-side pin fitting holes 38c provided in the front rail 26.

Similarly, the center of the adjuster plate 5 in the widthwise direction (up-down direction in FIG. 6) and weld bolts 46, 33, and 33 protruding at three positions symmetrical with respect to the widthwise center are arranged at positions corresponding to bolt insertion holes 41a and 41c provided in the camera stay 4.

With this structure, since the front rail 26 and the camera unit body 2 are completely separated by the adjuster plate 5, even when the camera unit body 2 is shifted in front of the front rail 26, it is possible to easily cope with the shifting by only changing the specifications of the adjuster plate 5, and there is no need to change the structure of the camera unit body 2. When the camera unit body 2 is shifted behind the front rail 26, it is also possible to cope therewith by only changing the specifications of the adjuster plate 5. As a result, the camera unit body 2 can be commoditized further.

Third Embodiment

Figure 7:
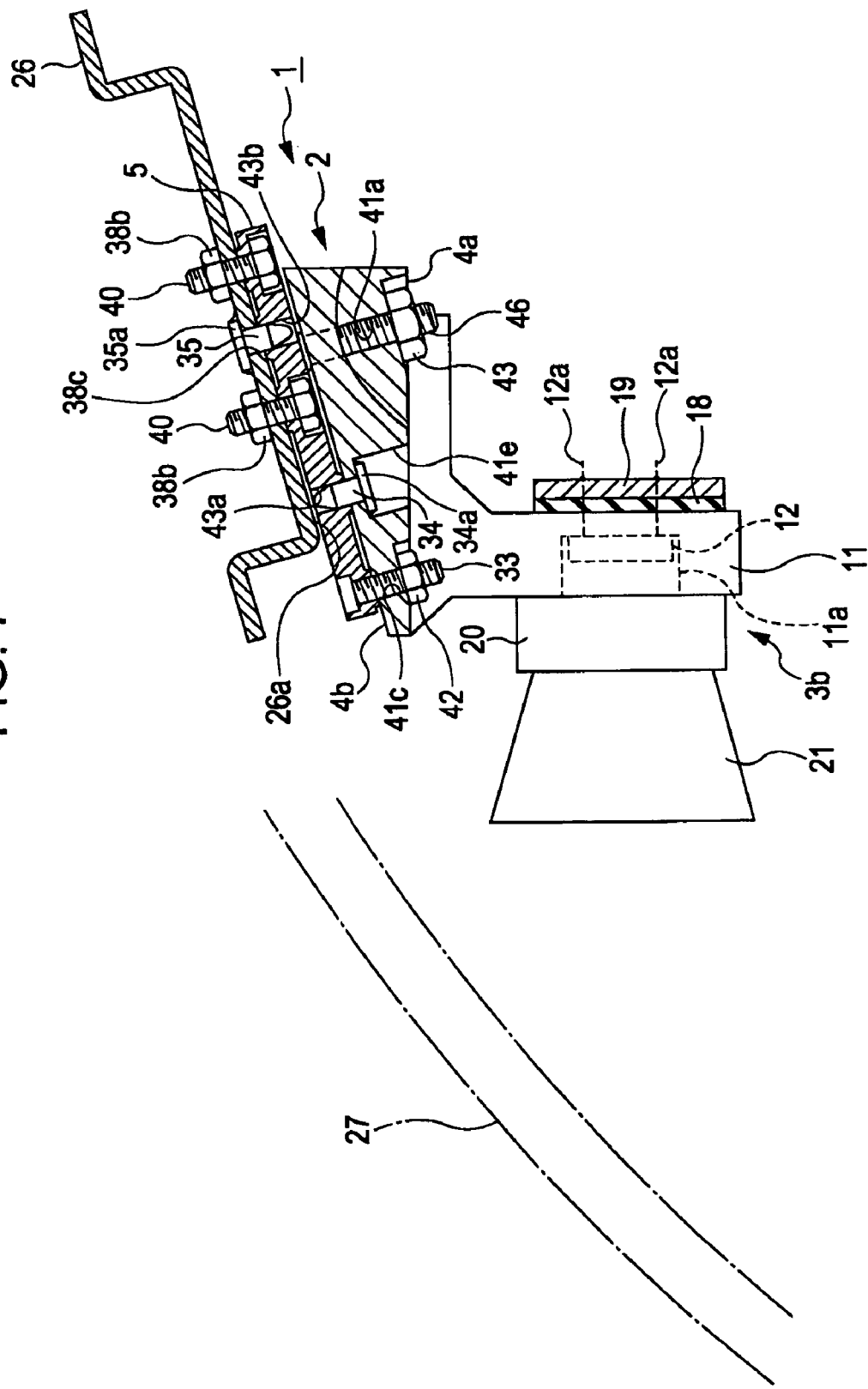
FIG. 7 is a cross-sectional view, corresponding to FIG. 3, of a stereo camera unit according to a third embodiment.
Figure 8A:
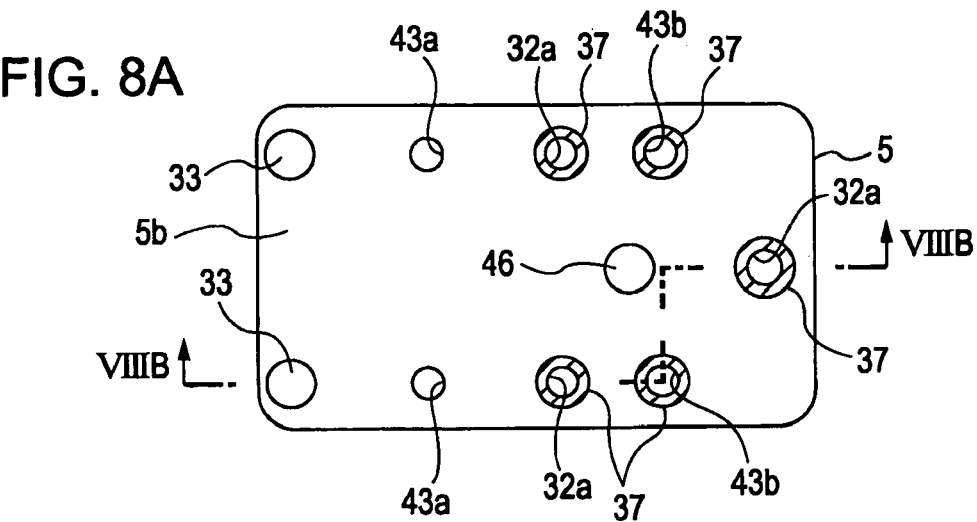
FIGS. 8A, 8B, and 8C show an adjuster plate in the third embodiment.
Figure 8B:
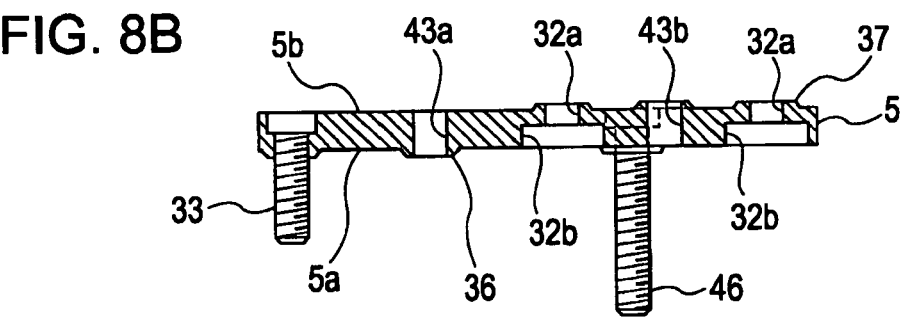
Figure 8C:
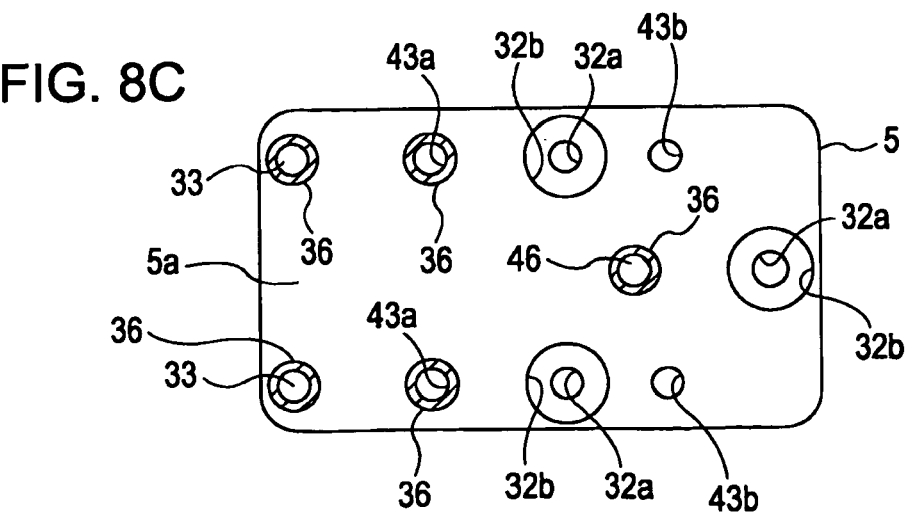

FIGS. 7 and 8 show a third embodiment of the present invention. FIG. 7 is a cross-sectional view of a stereo camera, and FIGS. 8A, 8B, and 8C show an adjuster plate. FIG. 8A is a plan view of the adjuster plate, FIG. 8B is a cross-sectional view taken along line VIIIB-VIIIB in FIG. 8A, and FIG. 8C is a bottom view of the adjuster plate.

While the positioning pins 34 and 35 respectively protrude from both surfaces of the adjuster plate 5 in the above-described first and second embodiments, positioning pins 34 and 35 respectively protrude from a camera stay 4 and a front rail 26 and pin fitting holes 43a and 43b in which the positioning pins 34 and 35 are fitted are provided in the adjuster plate 5 in the third embodiment. The same components as those in the second embodiment are denoted by the same reference numerals, and descriptions thereof are omitted.

Referring to FIG. 7, leading ends of a pair of positioning pins 34 protrude from an upper surface 4b of the camera stay 4. The positioning pins 34 are properly placed at the same positions as those of the pin fitting holes 41b in the above-described second embodiment. Heads 34a of the positioning pins 34 are fixed to bottoms of recesses 41e, which are provided in a bottom face of the camera stay 4 and have a predetermined depth, for example, by welding.

On the other hand, a pair of upper positioning pins 35 protrude downward from a plate-upper-surface contact face 26a of the front rail 26. The upper positioning pins 35 properly positioned and protrude at predetermined positions corresponding to the rail-side pin fitting holes 38c in the second embodiment. Heads 35a at their rear ends of the upper positioning pins 35 are fixed to an upper surface of the front rail 26, for example, by welding.

As shown in FIGS. 8A, 8B, and 8C, the adjuster plate 5 has properly positioned pin fitting holes 43a and 43b in which the positioning pins 34 and 35 are fitted. The protrusion heights of the positioning pins 34 and 35 are smaller than the thickness of the adjuster plate 5. When the camera stay 4 and the front rail 26 are fixed via the adjuster plate 5, the leading ends of the positioning pins 34 and 35 do not protrude from the surfaces of the adjuster plate 5.

With this structure, since the positioning pins 34 and 35 protrude respectively from the camera stay 4 and the front rail 26, the adjuster plate 5 need to have only the pin fitting holes 43a and 43b in which the positioning pins 34 and 35 are fitted. This simplifies the structure and facilitates production. Further, the pin fitting holes 43a and 43b provided in the adjuster plate 5 can be formed by post machining corresponding to the positioning pins 34 and 35 protruding from the front rail 26 and the camera stay 4, and this allows a high positioning accuracy.

The present invention is not limited to the above-described embodiments. For example, the positioning pins 34 may protrude from the adjuster plate 5, the pin fitting holes 41b to be fitted on the positioning pins 34 may be provided in the camera stay 4, the positioning pins 35 may protrude from the front rail 26, and the pin fitting holes 43b to be fitted on the positioning pins 35 may be provided in the adjuster plate 5. The structures may be reversed.

Instead of being buried in the camera stay 4, the adjuster plate 5, and the front rail 26, the positioning pines 34 and 35 may protrude integrally from the members 4, 5, and 26. Further, by changing the thickness of the adjuster plate 5 or tapering the adjuster plate 5 in the front-rear direction, the inclination angles of the camera unit body 2 in the height direction and front-rear direction can be set freely. The mount section is not limited to the front rail in the vehicle, for example, it may be a rear frame in the vehicle. When the camera unit body 2 is attached to the rear frame, the front glass 27 shown in FIGS. 3 and 5 is replaced with a rear glass.

While the stereo camera unit 1 includes the camera stay 4 and a pair of camera bodies 11 provided integrally with both sides of the camera stay 4 in the above-described embodiments, the present invention is also applicable to a case in which three or more cameras are used.

What is claimed is:

1. A stereo camera unit comprising:
   an adjuster plate;
   a camera unit body to be fixed to a mounted portion through the adjuster plate, the camera unit body including a pair of video cameras spaced a predetermined distance apart from each other,
   a pre-dimensioned positioning pin protruding from either one of the mounted portion and a surface of the adjuster plate to contact with the mount portion;
   a pre-dimensioned pin fitting hole provided in the other so as to be fitted on the positioning pin;
   a pre-dimensioned positioning pin protruding from either one of the camera unit body and a surface of the adjuster plate to contact with the camera unit body; and
   a pre-dimensioned pin fitting hole provided in the other so as to be fitted on the positioning pin.

2. The stereo camera unit according to claim 1, wherein the positioning pins are provided at least two positions on each surface of the adjuster plate.

3. The stereo camera unit according to claim 1, wherein the positioning pins are provided at least two positions on each of a surface of the mount section and a surface of the camera unit body to contact with the adjuster plate.

4. The stereo camera unit according to claim 1, wherein the adjuster plate is fixed separately to the mounted portion and the camera unit body.

* * * * *